United States Patent Office 2,988,575
Patented June 13, 1961

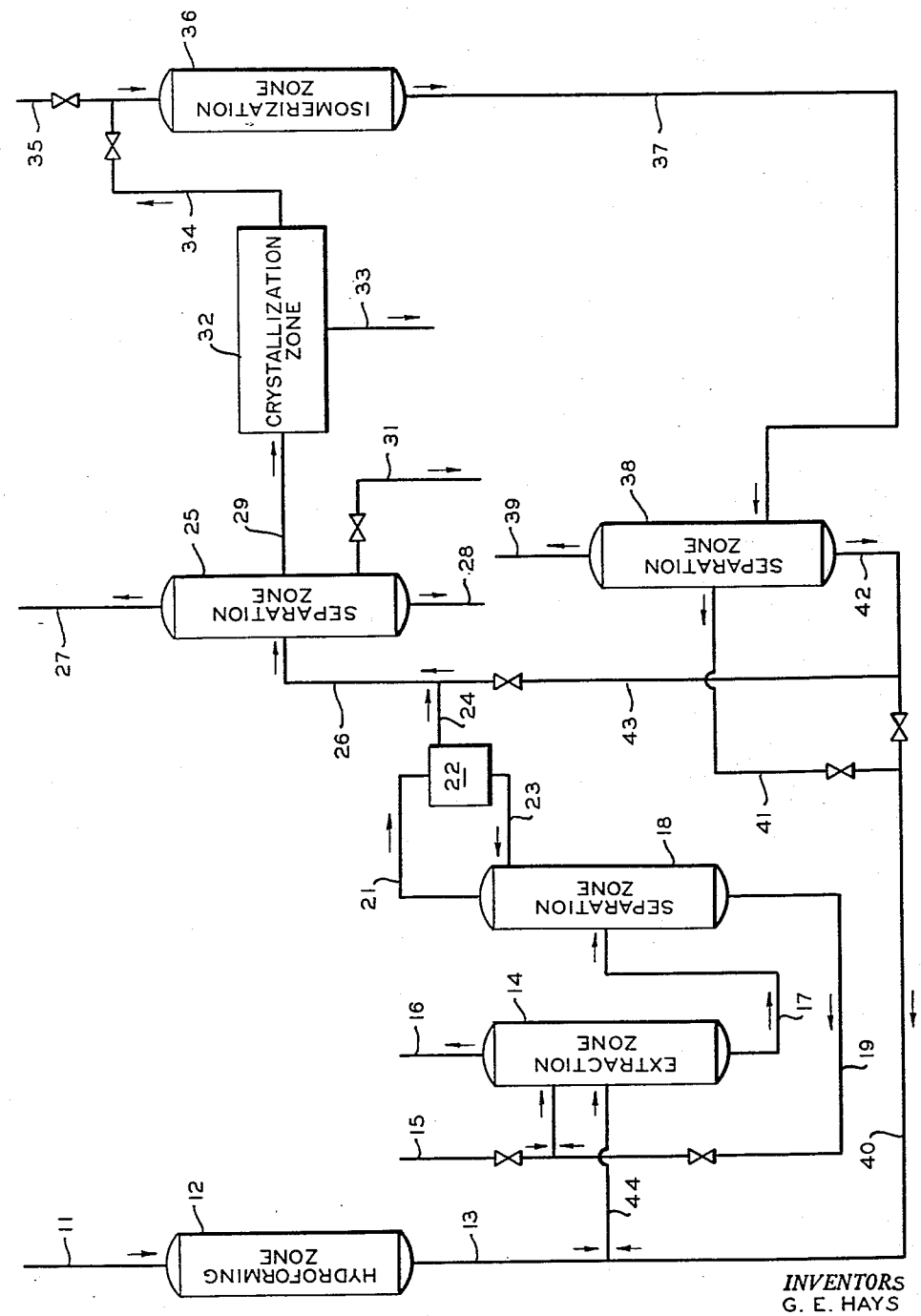

2,988,575
PRODUCTION OF ISOMERIC ALKYL BENZENES
George E. Hays and Harold M. Hawkins, Bartlesville, Okla., assignors to Phillips Petroleum Company, a corporation of Delaware
Filed June 1, 1954, Ser. No. 433,549
1 Claim. (Cl. 260—668)

This invention relates to the production of isomeric alkyl benzenes. In one of its aspects, the invention relates to the production of para-xylene. In another of its aspects, the invention relates to the production of para-xylene from a mixture of ortho- and meta-xylenes. In another of its aspects, the invention relates to the production of xylenes from a naphthenic hydrocarbon stream.

Para-xylene has for some time been an article of commerce. Hitherto, para-xylene was obtained from petroleum and coal tar xylene fractions, normally consisting essentially of ortho-, meta- and para-xylene and ethyl benzene, the content of the para-xylene varying between 10 and 20 percent. More recently, the development of synthetic fabrics, such as "Dacron," has increased the demand for para-xylene to such an extent that the supply of naturally occurring xylenes is insufficient. Thus, considerable interest has been focused upon the preferential conversion of other hydrocarbons to para-xylene.

It has been known that the isomeric forms of xylene, namely the ortho-xylene, meta-xylene and para-xylene, can be converted one into the other by isomerization. However, that isomerization has been difficult to accomplish and when the isomerization has been carried out under conditions such as would give a relatively selective and clean cut isomerization, the reaction has taken place at such a slow rate as to make it impractical for commercial operation. Even when the isomerization was carried out under relatively drastic conditions leading to appreciable degradation of the product, the reaction was quite slow. The xylenes have been isomerized by purely thermal means and by treatment under certain conditions with Friedal-Crafts type catalysts, e.g., aluminum chloride plus hydrogen chloride, but the required conditions were severe, the reaction was slow and the yields were poor.

Further development of the isomerization of xylenes resulted in the use of clay type cracking catalysts. Preferred catalysts of that type have been the acid treated clays or synthetic materials composed largely of silica in combination with alumina, magnesia, zirconia or boric oxide.

A naphtha fraction boiling generally in the range of 150 to 450° F., preferably in the range of 220 to 300° F., is hydroformed in the presence of a supported reforming catalyst. Catalysts of the type which we prefer to use in the hydroforming chamber include such hydroforming catalysts as hydrogen fluoride treated alumina impregnated with minor portions of platinum and halogen or with molybdenum oxide, nickel, or a mixture of cobalt oxide and molybdenum oxide, and silica-alumina impregnated with like materials.

We prefer to use a hydrogen fluoride treated alumina catalyst impregnated with between 0.01 and 5 weight percent platinum, preferably 0.1 to 1 weight percent platinum. Another platinum catalyst which we use in this invention is platinum on silica-alumina which has previously been heated to reduce the surface area to within the range of 10 to 70 square meters per gram.

Hydroforming of the naphthenic feed is carried out in the presence of the above-identified catalysts at a temperature in the range of 700° F. to 1000° F., preferably 800° F. to 950° F. A pressure within the range of atmospheric to 1000 p.s.i.g., preferably 200 to 600 p.s.i.g., is utilized to obtain the selective formation of xylenes while operating at a liquid hourly space velocity of 0.3 to 10, preferably 0.5 to 6. A hydrogen to hydrocarbon mol ratio of between 0.5:1 to 20:1, preferably 1:1 to 10:1, is utilized.

Each of the following objects will be attained by the aspects of this invention.

An object of tis invention is to provide an improved process for the production of isomeric alkyl benzenes. Another object of the invention is to provide an improved process for the production of para-xylene. Another object of the invention is to prevent a build-up of paraffinic and naphthenic impurities in a system selectively producing selected isomeric alkyl benzenes. Another object of the invention is to provide a process for the production of para-xylene from a mixture of ortho- and meta-xylene. Another object of the invention is to provide a method for the production of ortho-xylene from mixtures of isomeric forms of xylene. Another object of the invention is to provide a method for the isomerization of ortho- and meta-xylenes in the presence of a specific silica-alumina catalyst to selectively produce para-xylene. Another object of the invention is to produce para-xylene from a selected fraction of naphthenic hydrocarbons. Other and further objects of this invention will be apparent to those skilled in the art upon study of the accompanying disclosure.

Broadly speaking, this invention comprises the selective production of individual xylenes from an isomeric alkyl benzene mixture, from which para-xylene is removed by a separation such as fractional crystallization, after which the remaining portion of the isomeric alkyl benzene mixture is subjected to isomerization. The products of that isomerization are then passed to a separation zone. A small portion of those products of isomerization, i.e., in the neighborhood of from 8 to 20 percent thereof, are subjected to solvent extraction, such as in a conventional Udex process, prior to the separation so as to remove therefrom any paraffins, naphthenes or undesired aromatics which are formed during the isomerization stage. The xylene fraction comprising meta-, ortho- and para-xylene is then returned to the crystal purification zone for recovery of para-xylene by fractional crystallization. Operation in this manner has the advantage of continuously removing a sufficient amount of the paraffinic product so that a minimum of paraffins, naphthenes or undesired aromatics are supplied to the crystal purification zone.

Better understanding of this invention will be obtained upon reference to the drawing which is a schematic flow diagram used in the process of this invention.

Referring particularly to the drawing, a naphthenic hydrocarbon stock boiling in the range 150° F. to 300° F., preferably 220° F. to 300° F., is fed through inlet conduit 11 to hydroformirng zone 12, together with hydrogen in a mol ratio of hydrogen to hydrocarbon as set forth above. The normal xylenes formers or $C_8$ naphthenes, and minor amounts of ethyl benzene, are contained in the fraction boiling within the range of 220° F. to 275° F. and naturally occurring xylenes are found in the fraction boiling within the range of 275° F. to 300° F. Thus, the product which is removed from hydroforming zone 12 through conduit 13 contains isomeric alkyl benzene product, together with naturally occurring alkyl benzenes found in the original feed and higher and lower boiling materials. This product stream is passed through a solvent extraction zone 14, together with a solvent introduced through conduit 15, which solvent, more fully discussed hereinafter, selectively rejects any paraffins or naphthenes present in that stream.

The raffinate containing any paraffin or naphthene impurities is removed from solvent extraction zone 14 through outlet conduit 16. The extract containing the desired isomeric alkyl benzenes and any other aromatic material is passed from extraction zone 14 through conduit 17 to separation zone 18 wherein the solvent is recovered and is returned to the upper portion of extraction zone 14 through conduit 19. The aromatic material released from the solvent, together with any water released from the solvent, is removed from separation zone 18 through conduit 21 and is passed to condenser 22 wherein any water is condensed and is refluxed to separation zone 18 through conduit 23. The aromatic hydrocarbons are removed from condenser 22 through conduit 24 and are introduced into separation zone 25 through conduit 26.

Hydrocarbon materials, which are lower boiling than the desired xylene fraction, are removed from separation zone 25 through outlet conduit 27. Hydrocarbons which are higher boiling than the desired aromatic fraction are removed through conduit 28 as heavy products. An aromatic fraction containing ethyl benzene, ortho-xylene, meta-xylene and para-xylene, together with a small amount of toluene, and minor amounts of $C_8$ and $C_9$ paraffins, $C_9$ aromatics and $C_8$ naphthenes, is removed from separation zone 25, as an intermediate fraction, through conduit 29. If desired, the ortho-xylene can be removed as a second intermediate fraction through conduit 31. The fraction which is removed through conduit 29 is passed to a purification zone 32 in which para-xylene is separated from the liquid mixture. The purification which is carried out in purification zone 32 is preferably done by fractional crystallization.

The separation of para-xylene from other isomeric alkyl benzenes, by means of fractional crystallization, is becoming well known in the art, which is particularly exemplified by the processes disclosed in U.S. Patents Re. 23,810 of Schmidt and 2,540,977 of P. M. Arnold. It is preferred that the crystallization be carried out under such conditions that the crystals are continuously subjected to an internal reflux of relatively pure para-xylene. Para-xylene product which is obtained from purification zone 32 through conduit 33 usually has a purity upwards of 98 percent, though, if desired, lower purity product can be obtained. Uncrystallized material is removed from purification zone 32 through conduit 34 and is introduced, either with or without hydrogen from conduit 35, into isomerization zone 36.

If desired, we can obtain the isomerization of this hydrocarbon stream in isomerization zone 36 without the presence of extraneous hydrogen. The hydrogen to hydrocarbon mol ratio used in isomerization zone 36 is generally in the range of 0 to 20:1. The catalyst which we use in isomerization zone 36 can be any one of the isomerization catalysts which will isomerize the hydrocarbon stream to form additional para-xylene. If desired, we can use the same catalyst as that used in hydroforming zone 12 or we can use a silica-alumina catalyst, such as is prepared by the method of McKinney in U.S. Patents 2,142,324 and 2,147,985. In general, these catalysts are prepared by first forming a hydrous silica gel or jelly from an alkali-silicate and an acid, washing soluble material from the gel, treating or activating the gel with an aqueous solution of a suitable aluminum salt, and subsequently washing and drying the treated material. In this manner, a part of the aluminum, presumably in the form of a hydrous oxide or loose hydroxide compound formed by hydrolysis, is selectively adsorbed by the hydrous silica, and is not removed by subsequent washing. This selective adsorption is attested by a decrease in the aluminum content of the activating solution as well as a decrease in pH as the activation progresses. The most often used catalyst of this type, at present, is a silica-alumina catalyst, prepared by treating a wet or partially dried hydrous silica gel with an aluminum salt solution, such as a solution of aluminum chloride or sulfate, and subsequently washing and drying the treated material. Whether prepared by this method or by some modification thereof, the catalyst will contain a major portion of silica, and a minor portion of aluminum oxide. This minor portion of alumina will generally not be in excess of 10 percent by weight, and will more often, and generally more preferably, be between about 0.1 and 1.5 or 2 percent by weight, on the dry basis.

In the above-outlined procedure, the starting materials are usually chosen from the water-soluble silicates and the commercially available mineral acids. Sulfuric and hydrochloric acids are preferred on economic grounds, although any acid may be used which will provide suitable hydrogen ion concentration and form a silica hydrogel of proper consistency. Thus, phosphoric, acetic, nitric, and boric acids may be used in certain instances. The gel formed should be acidic and should be partially dried and washed free of excess acid prior to activation, and the extent of drying is carefully controlled since the eventual catalyst activity is apparently somewhat dependent on the maintenance of the hydrous oxide composition prior to the activation treatment. The salt solution for activation may be prepared from any water-soluble hydrolyzable salt of aluminum, with the sulfate or chloride being preferred. Other alternate salts include acetates and nitrates. The adsorption of the hydrous aluminum oxide by the silica gel proceeds smoothly with hydrated silica gel, whereas with dried silica, the adsorption and the activation may be much less satisfactory. Active catalysts are preferably rinsed free of the salt solution and a moderate concentration effect or "curing" may be obtained by partial drying of the rinsed gel. The final washing then serves to remove unadsorbed salts and free acid, and the final drying which is performed at moderate temperatures produces hard, brittle granules of gel containing negligible quantities of compounds other than silica and alumina.

Modifications may be made in the foregoing procedure and catalysts of suitable activity may result. One obvious alternative is the addition of the aluminum salt to the silicate before gelation. This method enables the incorporation of greater proportions of aluminum oxide, but activity may not be proportional to increasing aluminum oxide contents above about 1 to about 15 weight percent so that little is gained by the modification and the proper degree of salt and acid removal may be more difficult. Non-uniform materials usually result from the mechanical mixing of hydrous aluminum oxide and silica gels, so that catalysts prepared in this manner may be less satisfactory. Other means of accomplishing the preparation may be devised, however, in view of the foregoing description.

As indicated above, the finished gel-type catalysts comprise essentially silica and alumina, with various quantities of water. The aluminum oxide may be present in minor activating quantities of about 1 to about 15 weight percent of the total oxides. In many instances, catalytic activity may be as great with about 1 to 5 percent of aluminum oxide as with about 10 to 15 percent. Still greater amounts up to about 50 weight percent may be added, if desired, although the physical characteristics and activity of the catalyst may be adversely affected. In order to retain the selectivity of the catalyst for the present reaction, other heavy metal oxides than those hereinbelow recited, or salts, are usually absent from the starting materials and the finished gel. Oxides of metals of group IIIB and IVA of the periodic system may be incorporated with the silica and alumina, if desired. For example, small quantities of zirconia may be used in addition to alumina for activating the silica gel. Such metal oxides may be added in the same ways discussed above with respect to aluminum oxide.

Because of the removal of para-xylene in purification zone 32, the xylene mixture charged to isomerization zone 36 is below the thermodynamic equilibrium in para-xylene content. For this reason, a portion of the ortho-xylene and meta-xylene in this mixture is converted to para-xylene, thus once again approaching the thermodynamic equilibrium in para-xylene content. A small amount of light hydrocarbons, such as methane, ethane, propane, butane and pentane, and heavy hydrocarbons, including $C_8$ and $C_9$ paraffins, $C_9$ aromatics and $C_8$ naphthenes, produced in the isomerization step, is removed from isomerization zone 36, together with the desired isomerization product, through conduit 37. It is desired to return this product stream to separation zone 25 through conduits 37, 42, 43 and 26. However, if this cycle were to be indefinitely continued, the build-up of paraffin, naphthene and other undesired impurities which boil in substantially the same boiling range as the desired xylene fraction, would be such as to eventually cause a shut-down of the operation.

We have devised a process whereby it is possible to utilize this product stream for the recovery of the desired para-xylene product without an undue build-up of undesired impurities. By the process of this invention, light materials are removed as overhead from separation zone 38 through conduit 39. Heavy materials, including the xylenes, are removed through conduit 42. A side stream of relatively light material is removed through conduit 41 to conduit 40. We remove a minor amount, say from 8 to 20 percent, preferably 10 to 15 percent, of the stream removed from separation zone 38 through conduit 42, and pass that portion of the stream, together with the stream from conduit 41, into extraction zone 14 through conduits 40 and 44. The remainder of the material removed from separation zone 38 through conduit 42 is passed through conduit 43 to separation zone 25. A major portion of undesired paraffinic impurities contained in the stream passed through conduits 40 and 44 is removed in extraction zone 14 and that purified stream from which the undesired impurities have been removed is returned to separation zone 25, together with product from hydroforming zone 12. Operating in this manner, we are able to continuously utilize the product stream from isomerization zone 36 without encountering any difficulty whatever by reason of the production of small amounts of undesired impurities.

We operate isomerization zone 36 under isomerization conditions which include a temperature within the range of 600° F. to 1000° F., preferably 700° F. to 900° F., a pressure of from atmospheric to 1000 p.s.i.g., preferably atmospheric to 500 p.s.i.g., and a liquid hourly space velocity of 0.3 to 10, preferably 0.5 to 6. Naphthene impurities which are found in the product stream removed from isomerization zone 36 generally result from trace metals which act as hydrogenation or dehydrogenation catalysts and, in the presence of added hydrogen, tend to convert the aromatics to naphthenes.

Better understanding of this invention will be obtained upon study of the following example which is presented as being exemplary and not with the idea of unduly limiting the scope of this invention.

EXAMPLE

A product stream having the following composition is removed from isomerization zone 36.

| | Pounds |
|---|---|
| Hydrogen | 38,190 |
| Methane | 31,350 |
| Ethane | 3,790 |
| Propane | 950 |
| Butane | 2,840 |
| Pentane | 1,900 |
| $C_6+$ benzene | 11,390 |
| Toluene | 28,890 |
| Ethyl benzene | 79,600 |
| Para-xylene | 70,460 |
| Meta-xylene | 175,210 |
| Ortho-xylene | 85,790 |
| $C_9$ aromatics | 22,240 |
| $C_8$ paraffins | 11,480 |
| $C_9$ paraffins | 11,480 |
| $C_8$ naphthenes | 2,970 |
| Total | 578,530 |

That stream is passed to separation zone 38, maintained at a pressure of 150 p.s.i.g. and a kettle temperature of 450° F., where the light materials, hydrogen through butane, are removed overhead, together with 1800 pounds of the pentane. A bottom stream from separation zone 38 is divided into two parts, a first stream having the following composition is passed through solvent extraction zone 14, better known as a Udex separation, using diethylene glycol as the solvent. The extraction is carried out in this extraction zone at a pressure of 60 p.s.i.g. and a temperature of 250° F.

| | Pounds |
|---|---|
| $C_6+$ benzene | 114 |
| Toluene | 1,439 |
| Ethyl benzene | 7,960 |
| Para-xylene | 7,046 |
| Meta-xylene | 17,521 |
| Ortho-xylene | 8,570 |
| $C_9$ aromatics | 2,224 |
| $C_8$ paraffins | 1,148 |
| $C_9$ paraffins | 1,148 |
| $C_8$ naphthenes | 297 |
| Total | 47,467 |

A side stream having the following composition is removed from zone 38 and is also passed to solvent extraction zone 14.

| | Pounds |
|---|---|
| Pentane | 100 |
| $C_6+$ benzene | 10,250 |
| Toluene | 14,500 |
| Total | 24,750 |

The remainder of the bottoms stream from separation zone 38 is passed to separation zone 25, operated at a pressure of 2 p.s.i.g. and a kettle temperature of 320° F. A fresh feed having the following composition is added to the system through conduit 13.

| | Pounds |
|---|---|
| Toluene | 3,660 |
| Ethyl benzene | 26,400 |
| Para-xylene | 18,480 |
| Meta-xylene | 40,450 |
| Ortho-xylene | 22,300 |
| $C_9$ aromatics | 3,650 |
| $C_8$ paraffins | 1,170 |
| $C_9$ paraffins | 1,170 |
| Total | 117,280 |

The following materials are removed by the separation zones 14 and 25.

| | Pounds |
|---|---|
| Pentane | 100 |
| $C_6+$ benzene | 11,390 |
| Toluene | 17,390 |
| $C_9$ aromatics | 10,740 |
| $C_8$ paraffins | 1,150 |
| $C_9$ paraffins | 1,150 |
| $C_8$ naphthenes | 270 |
| Total | 42,190 |

The resulting para-xylene concentrate is passed to purification zone 32 through line 29, where it is cooled to a temperature of −100° F. so as to crystallize out para-xylene.

Product

| | Pounds |
|---|---|
| Toluene | 20 |
| Ethyl benzene | 140 |
| Para-xylene | 64,140 |
| Meta-xylene | 280 |
| Ortho-xylene | 130 |
| $C_9$ aromatics | 20 |
| $C_8$ paraffins | 20 |
| $C_9$ paraffins | 20 |
| Total | 64,770 |

A stream having the following composition is fed to isomerization zone 36, together with 38,200 pounds of hydrogen and 30,400 pounds of methane.

| | Pounds |
|---|---|
| Toluene | 15,140 |
| Ethyl benzene | 105,860 |
| Para-xylene | 24,800 |
| Meta-xylene | 215,380 |
| Ortho-xylene | 107,960 |
| $C_9$ aromatics | 15,130 |
| $C_8$ paraffins | 11,480 |
| $C_9$ paraffins | 11,480 |
| $C_8$ naphthenes | 2,700 |
| Total | 509,930 |

Although this specific example has been disclosed as utilizing diethylene glycol as the solvent in the solvent extraction zone 14, other solvents than diethylene glycol, can be utilized in such a separation to effect the removal of paraffinic materials from the material which is to be subjected to the purification step. Additional solvents which can be used for separating aromatics from petroleum mixtures are as follows:

Phenol
"Carbitol" (diethylene glycol monoethyl ether)
Tetramine
Aniline
Resorcinol
Diacetin
Tetraethylene glycol
Triethylene glycol
Anisidine
Acetamide
Triacetin
Xylidine
Acetanilide
Diethanolamine
Nitrobenzene
"Chlorex"
Diaminopropanol
Tricresylphosphate
Benzaldehyde
Triethanolamine
Eugenol
Diphenyl amine
Acetophenone
Xylenol
"Carbitol" acetate
Butyl Carbitol
Phenetidine
Dibutyl phthalate The specific conditions under which extraction zone 14 is operated will be dependent upon the specific solvent utilized, the conditions being such that the solvent and hydrocarbons are maintained as liquids.

It will be apparent to those skilled in the art that various modifications of this invention can be made upon study of the accompanying disclosure. Such modifications are believed to be clearly within the spirit and the scope of this invention.

We claim:

A process for the production of para-xylene from a mixture of isomeric xylenes which comprises passing said mixture to a crystallization zone; cooling said mixture in said crystallization zone to a temperature whereat para-xylene is crystallized out of solution thereby recovering same; subjecting the mother liquor from said crystallization zone to isomerization in the presence of an isomerization catalyst and under isomerization conditions so as to produce a mixture enriched in para-xylene; separating this last said mixture into a low boiling fraction, an intermediate boiling fraction and a high boiling fraction, said high boling fraction comprising isomeric xylenes; dividing the high boiling fraction into a major and a minor stream; combining the intermediate fraction with said minor stream; subjecting the combined intermediate fraction and minor stream to solvent extraction to remove paraffins and naphthenes formed in said isomerization step; combining the thus treated combined minor stream with the major stream and passing the combined stream to said crystallization zone along with fresh feed of isomeric xylenes.

References Cited in the file of this patent

UNITED STATES PATENTS

| | | |
|---|---|---|
| 2,425,559 | Passino et al. | Aug. 12, 1947 |
| 2,521,444 | Brooke et al. | Sept. 5, 1950 |
| 2,527,824 | Kemp | Oct. 31, 1950 |
| 2,532,276 | Birch et al. | Dec. 5, 1950 |
| 2,564,388 | Bennett et al. | Aug. 14, 1951 |
| 2,656,397 | Holzman et al. | Oct. 20, 1953 |

OTHER REFERENCES

Kalichevsky: "Modern Methods of Refining Lubricating Oils" (1938), Reinhold, N.Y., publisher, page 134.